United States Patent
John et al.

(10) Patent No.: US 12,198,017 B2
(45) Date of Patent: Jan. 14, 2025

(54) VERACITY ASSESSMENT OF A DATA MODEL

(71) Applicant: ACCENTURE GLOBAL SOLUTIONS LIMITED, Dublin (IE)

(72) Inventors: Rajeev John, Pune (IN); Priya Das, Bangalore (IN); Vivek Kumar Pandey, Bangalore (IN); Vismay Vyas, Pune (IN); Srinivasan Ramaswamy, Chennai (IN); Satyaki Bhattacharya, Kolkata (IN); Anal Kumar De, Kolkata (IN); Sanjaykumar Joshi, Bangalore (IN); Jayant Swamy, Bangalore (IN); Aniruddha Ray, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 955 days.

(21) Appl. No.: 16/997,480

(22) Filed: Aug. 19, 2020

(65) Prior Publication Data

US 2022/0058513 A1 Feb. 24, 2022

(51) Int. Cl.
| | |
|---|---|
| G06N 20/10 | (2019.01) |
| G06F 17/18 | (2006.01) |
| G06F 18/24 | (2023.01) |
| G06N 5/01 | (2023.01) |
| G06N 5/02 | (2023.01) |
| G06N 5/04 | (2023.01) |
| G06N 7/01 | (2023.01) |
| G06N 20/00 | (2019.01) |
| G06N 20/20 | (2019.01) |

(52) U.S. Cl.
CPC ............. *G06N 20/00* (2019.01); *G06F 17/18* (2013.01); *G06F 18/24* (2023.01)

(58) Field of Classification Search
CPC ......... G06N 20/00; G06F 17/18; G06F 18/24; G06V 10/774; G06V 10/776; G06V 10/7792
See application file for complete search history.

(56) References Cited

U.S. PATENT DOCUMENTS

| | | | |
|---|---|---|---|
| 6,681,211 B1 * | 1/2004 | Gatto | G06Q 40/04 |
| | | | 705/37 |
| 8,706,656 B1 * | 4/2014 | Lin | G06N 20/00 |
| | | | 706/45 |
| 10,521,419 B1 | 12/2019 | Swamy et al. | |

(Continued)

*Primary Examiner* — Brandon S Cole
(74) *Attorney, Agent, or Firm* — Mannava & Kang, P.C.

(57) ABSTRACT

A system for assessing a data model includes a data receiver, a model receiver, and a model assessment device. The data receiver receives training data, historical data, and production data. The model receiver receives the data model associated with the historical data and trained using the training data. The historical data includes a first outcome of the data model provided based on an input feature in the production data. The model assessment device identifies a key feature in the production data relative to the input feature based on a target category in the historical data and a statistical distribution of the input feature in the production data. The model assessment device determines a second outcome of the data model based on the key feature. In response to the second outcome being different from the first outcome, the model assessment device determines a veracity score for assessing the data model.

14 Claims, 10 Drawing Sheets

(56) References Cited

U.S. PATENT DOCUMENTS

| | | | |
|---|---|---|---|
| 10,706,439 B1* | 7/2020 | Lerner | G06Q 30/0269 |
| 2012/0142429 A1* | 6/2012 | Muller | A63F 13/69 |
| | | | 463/42 |
| 2014/0172573 A1* | 6/2014 | Saurabh | G06Q 30/0261 |
| | | | 705/14.58 |
| 2016/0170996 A1* | 6/2016 | Frank | G06Q 30/0203 |
| | | | 707/748 |
| 2016/0224803 A1* | 8/2016 | Frank | G06F 21/6245 |
| 2017/0352346 A1* | 12/2017 | Paulik | G10L 15/07 |
| 2018/0018590 A1 | 1/2018 | Szeto et al. | |
| 2019/0102438 A1 | 4/2019 | Murray et al. | |
| 2019/0205977 A1* | 7/2019 | Way | G06N 20/00 |
| 2019/0213258 A1 | 7/2019 | Bacarella et al. | |
| 2019/0213260 A1 | 7/2019 | Bacarella et al. | |
| 2019/0303480 A1* | 10/2019 | Canis | G06F 16/951 |
| 2019/0362222 A1 | 11/2019 | Chen | |
| 2020/0160190 A1 | 5/2020 | Swamy et al. | |
| 2020/0394360 A1* | 12/2020 | Dunn | G06F 40/169 |
| 2021/0037043 A1 | 2/2021 | Lee et al. | |

* cited by examiner

| Bias | Age | checkingstatus | Amount | Duration | Purpose |
|---|---|---|---|---|---|
| Importance Value | 1 9% | 1 11% | 0 13% | 0 9% | 0 9% |

VERACITY ASSESSMENT OF A DATA MODEL

BACKGROUND

Decision making is vital for managing operations in any organization. Modern data analytics leverages various machine learning (ML) models to automate or supplement a decision-making process with predictive analysis. These ML models (or data models) are typically trained on different types of data corresponding to an application (e.g., banking, telecom, e-commerce, etc.). Hence, each trained ML model provides a set outcome that is specific to an application. However, a difference between such training data and production data may cause an ML model to provide an outcome that is either not representative of the production data or deviates from an operational or organizational objective (e.g., maximize revenue, legal compliance, data update, etc.). Therefore, the veracity or trustworthiness of the ML model is dependent on the relevance of data used for generating the outcome.

Data relevance may relate to different aspects such as sufficiency, manipulation, and staleness of data. Each of such data aspects is typically addressed by a separate solution and no single existing solution assesses a combined impact of these data aspects on an ML model, and an outcome thereof. Moreover, since such outcome is specific to an application, conventional solutions usually cater to a single application (or industry) for determining data relevance and may not be reused for another application (or industry) without customization. This adds to operational as well as solution customization costs and may delay assessment of an in-use ML model for veracity.

BRIEF DESCRIPTION OF DRAWINGS

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

FIG. 4 illustrates a table to calculate a bias factor of data used by a data model, according to an example embodiment of the present disclosure.

FIG. 6 illustrates a table including a manipulated data used by a data model, according to an example embodiment of the present disclosure.

DETAILED DESCRIPTION

Figure 1:
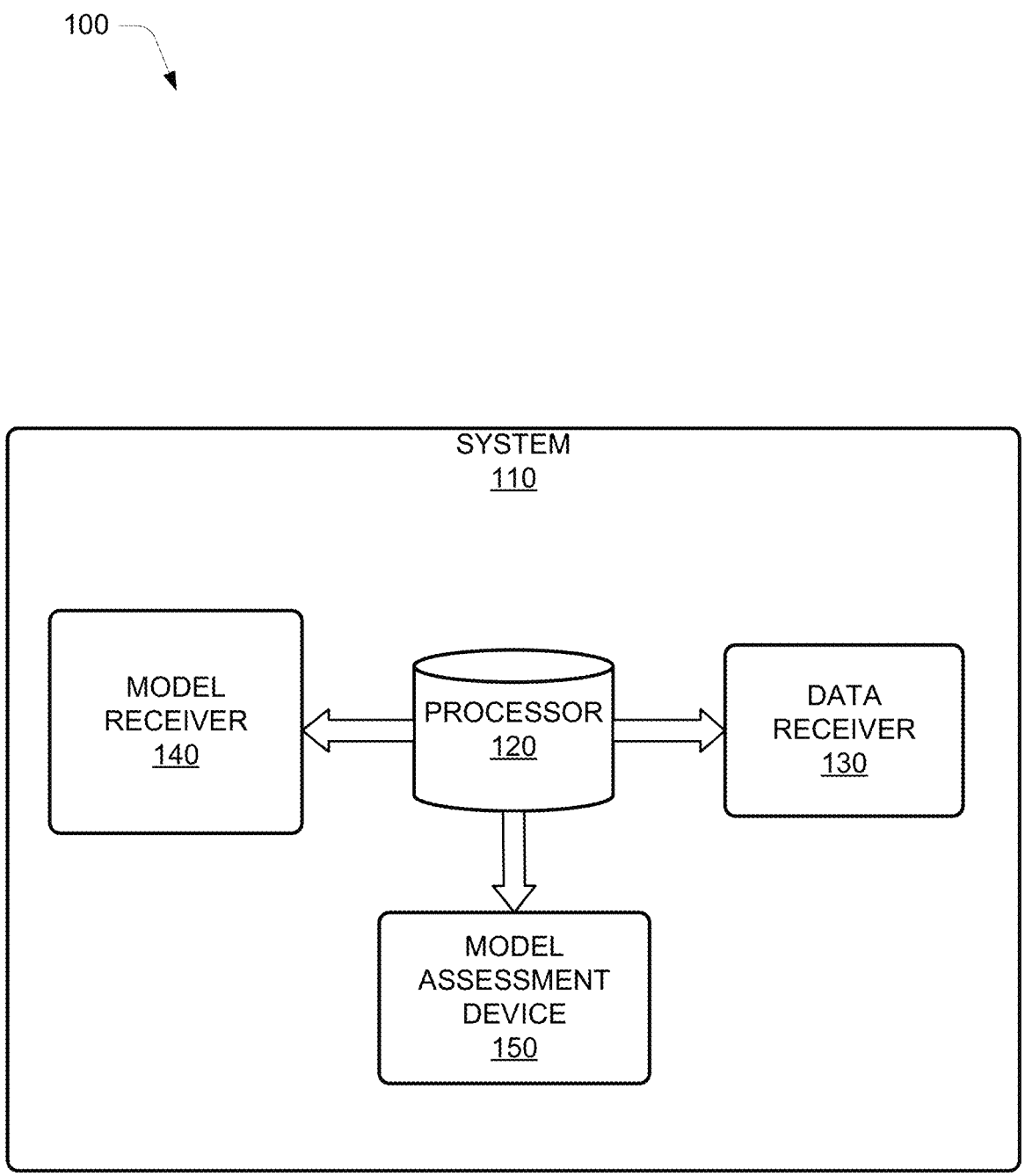
FIG. 1 illustrates a system for assessing veracity of a data model based on data relevance, according to an example embodiment of the present disclosure.

For simplicity and illustrative purposes, the present disclosure is described by referring mainly to examples thereof. The examples of the present disclosure described herein may be used independently or together in different combinations. In the following description, details are set forth in order to provide an understanding of the present disclosure. It will be readily apparent, however, that the present disclosure may be practiced without limitation to any of these details. Also, throughout the present disclosure, the terms "a" and "an" are intended to denote at least one of a particular element. The terms "a" and "an" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to. The term "relevant" means closely connected or appropriate to what is being done or considered.

Various embodiments of the present disclosure describe an assessment of a data model for veracity. In an example, the embodiments may be implemented using a system including a data receiver, a model receiver, and a model assessment device including a bias analyzer, a feature gap analyzer, a manipulation analyzer, a staleness analyzer, and a recommendation device. The data receiver may receive input data associated with a data model. The input data may include training data, production data, historical data, and metadata. The data model may be pre-trained using the training data and received by the model receiver. The received historical data associated with the data model may include a first outcome of a data outcome provided based on a corresponding input feature in the production data. The model assessment device may identify a key feature in the production data based on a target category in the historical data and a statistical distribution of the input feature in the production data. The model assessment device further determines a second outcome of the data model based on the identified key feature. Based on the second outcome being relatively different from the first outcome, the model assessment device may assess a differential outcome indicating a measure of veracity of the data model. Such differential outcome triggers one or more of the bias analyzer, the feature gap analyzer, the manipulation analyzer, and the staleness analyzer for determining a veracity score for assessing the data model. The bias analyzer may determine a bias factor based on an importance value of an input category corresponding to the input feature. The feature gap analyzer may determine a feature gap factor based on an absolute difference between a first performance measure and a second performance measure of the data model based on the first outcome and the second outcome respectively. The manipulation analyzer may determine a manipulation factor based on the input feature being manipulated and a total number of features in the production data, and the staleness analyzer may calculate a staleness factor based on the input feature being determined as a target feature and the importance value of the corresponding input category in the production data. The recommendation device may then calculate the veracity score providing the measure of veracity of the data model based on the bias factor, the feature gap factor, the manipulation factor, and the staleness factor, or any combinations thereof. The recommendation device may also manipulate the training data based on the key feature and provide a recommendation to re-train the data model based on the manipulated training data. In some embodiments, based on such recommendation, the recommendation device may re-train of the data model using the manipulated training data for improving the veracity of the data model.

The present disclosure provides for a system that may assess a veracity of a data model based on a relevance of data fed thereto for providing an outcome. The present disclosure may assess the data model based on a veracity score associated therewith. The veracity score may be calculated based on aspects, i.e., bias factor, feature gap factor, manipulation factor, staleness factor, or a combination thereof, of an input feature providing a measure of relevance of the data processed by the data model. The present disclosure also provides to assess a combined impact of these data aspects on the data model. Further, the present disclosure may assist to improve or enhance the veracity of the data model and update the training data to retrain the data model for improving the veracity thereof.

Embodiments are described in the context of veracity assessment of a data model for financial analysis. However, it will be appreciated that the embodiments and concepts described herein may be applied in other scenarios involving a relationship between a data model and data related thereto. Examples of these scenarios may include, but are not limited to, facial recognition, natural language processing, user-generated content management, search engine optimization, customer segmentation, inventory optimization, risk assessment, sales forecast, churn prediction, and recommendation engines.

FIG. 1 illustrates a system 110 for assessing veracity of a data model, according to an example embodiment of the present disclosure. The system 110 may be implemented by way of a single device or a combination of multiple devices that are operatively connected or networked together. The system 110 may be implemented in hardware or a suitable combination of hardware and software. As illustrated, the system 110 may be a hardware device including a processor 120 executing machine readable program instructions to, at least one of, communicate synchronously or asynchronously with one or more software applications, databases, storage devices, or appliances operating via same or different communication protocols, formats, database schemas, platforms or any combination thereof, receive a data model and input data associated therewith including training data, historical data, production data (collectively, model data), determine an input feature in the production data, determine a target category in the historical data and an importance value of an input category of the input feature in the production data, determine a key feature in the production data relative to the input feature, identify the key feature based on the target category and a statistical distribution of the input feature in the production data, parse the historical data to determine a first outcome of the data model based on the input feature, determine a second outcome of the data model based on the key feature, calculate a first performance measure and a second performance measure of the data model based on the first outcome and the second outcome respectively, determine the input feature as being a target feature based on the importance value of the input category, determine a timestamp associated with the target feature, determine an aspect (e.g., a bias factor, a feature gap factor, a manipulation factor, and a staleness factor) of the input feature, calculate a veracity score of the data model based on the one or more determined aspects of the input feature, manipulate the training data based on the key feature, and recommend to re-train the data model based on the manipulated training data.

The "hardware" may comprise a combination of discrete components, an integrated circuit, an application-specific integrated circuit, a field programmable gate array, a digital signal processor, or other suitable hardware. The "software" may comprise one or more objects, agents, threads, lines of code, subroutines, separate software applications, two or more lines of code or other suitable software structures operating in one or more software applications or on one or more processors. The processor 120 may include, for example, microprocessors, microcomputers, microcontrollers, digital signal processors, central processing units, state machines, logic circuits, and/or any devices that manipulate data or signals based on operational instructions. Among other capabilities, the processor 120 may fetch and execute computer-readable instructions in a memory operationally coupled with the system 110 for performing tasks such as signal coding, data processing input/output processing, power control, and/or any other functions.

In one example, the processor 120 may be coupled to a data receiver 130, a model receiver 140, and a model assessment device 150. The data receiver 130 may correspond to a component for receiving input data including the model data, and metadata. The data receiver 130 may perform, at least one of, assigning an indicator to the model data (hereinafter referred to as tagged model data) in the input data, and parsing the model data to segregate the training data, the production data, and the historical data.

The model receiver 140 may correspond to a component for receiving a data model. The model receiver 140 may perform, at least one of, receiving the data model corresponding to the received input data, determining the training data, the production data, and the historical data associated with the data model, and determining the input feature in the production data and the corresponding first outcome of the data model, where the historical data includes the first outcome. In some embodiments, the data model may be received as a part of the input data received by the data receiver 130, such that the model receiver 140 may retrieve the data model from the input data based on the tagged model data.

The model assessment device 150 may correspond to a component for assessing the data model. The model assessment device 150 may perform, at least one of, determining a target category in the historical data and an importance value of an input category of the input feature in the production data, determining the key feature in the production data relative to the input feature, where the key feature may be identified based on the target category and a statistical distribution of the input feature in the production data, determining the second outcome of the data model based on the key feature, calculating the first performance measure and the second performance measure of the data model based on the first outcome and the second outcome respectively, determining a relevance, i.e., bias, feature gap, manipulation, staleness, or a combination thereof, of the input feature to the data model, assessing the data model, or veracity thereof, based on an aspect of the input feature such that the aspect may provide a measure of relevance of the input feature to the data model, calculating the veracity score of the data model as a function of the one or more determined aspects of the input feature for assessing the data model, manipulating the training data based on the key feature, and recommending to re-train the data model based on the manipulated training data.

Figure 2:
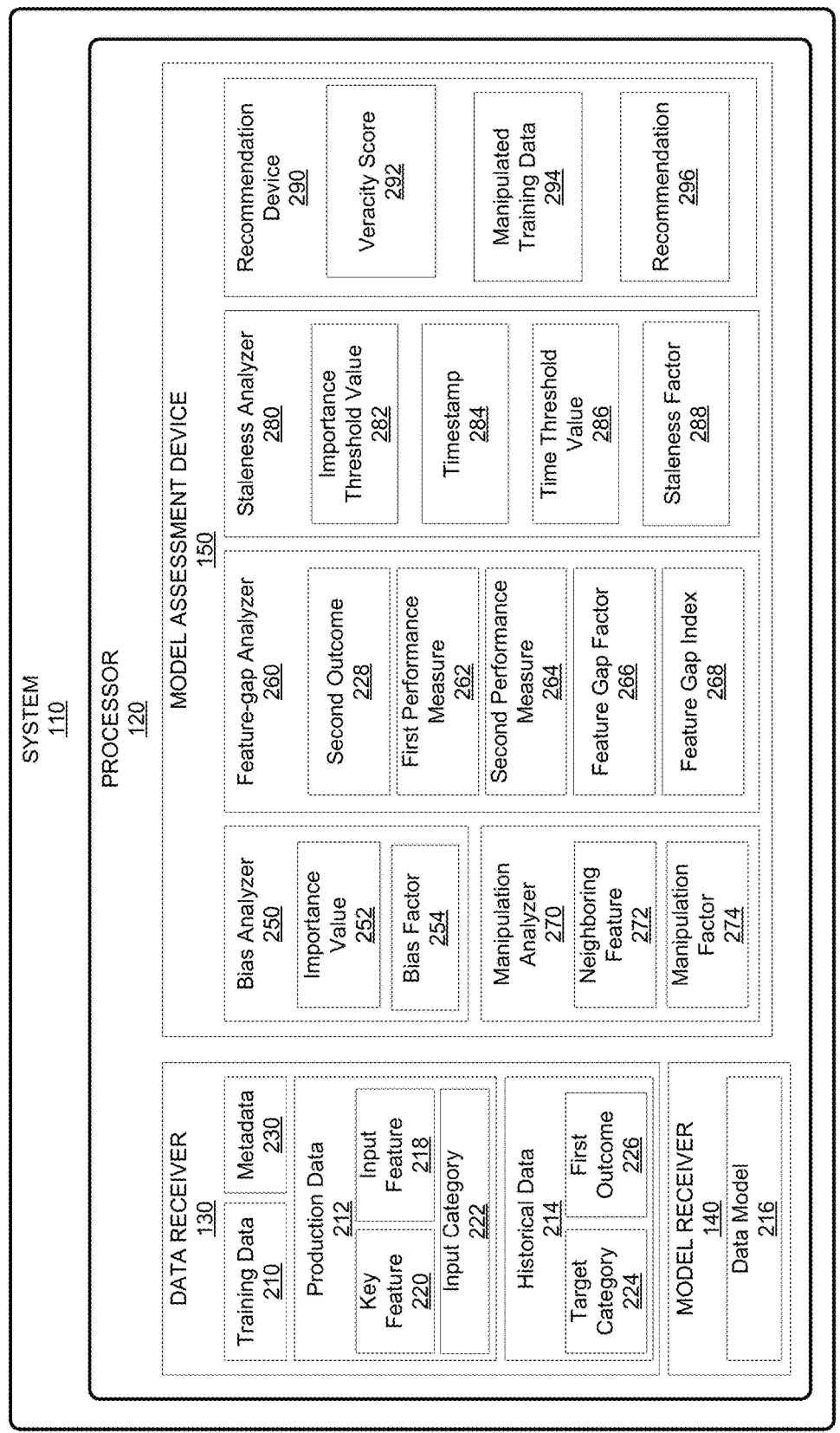
FIG. 2 illustrates components of the system of FIG. 1, according to an example embodiment of the present disclosure.
Figure 3:
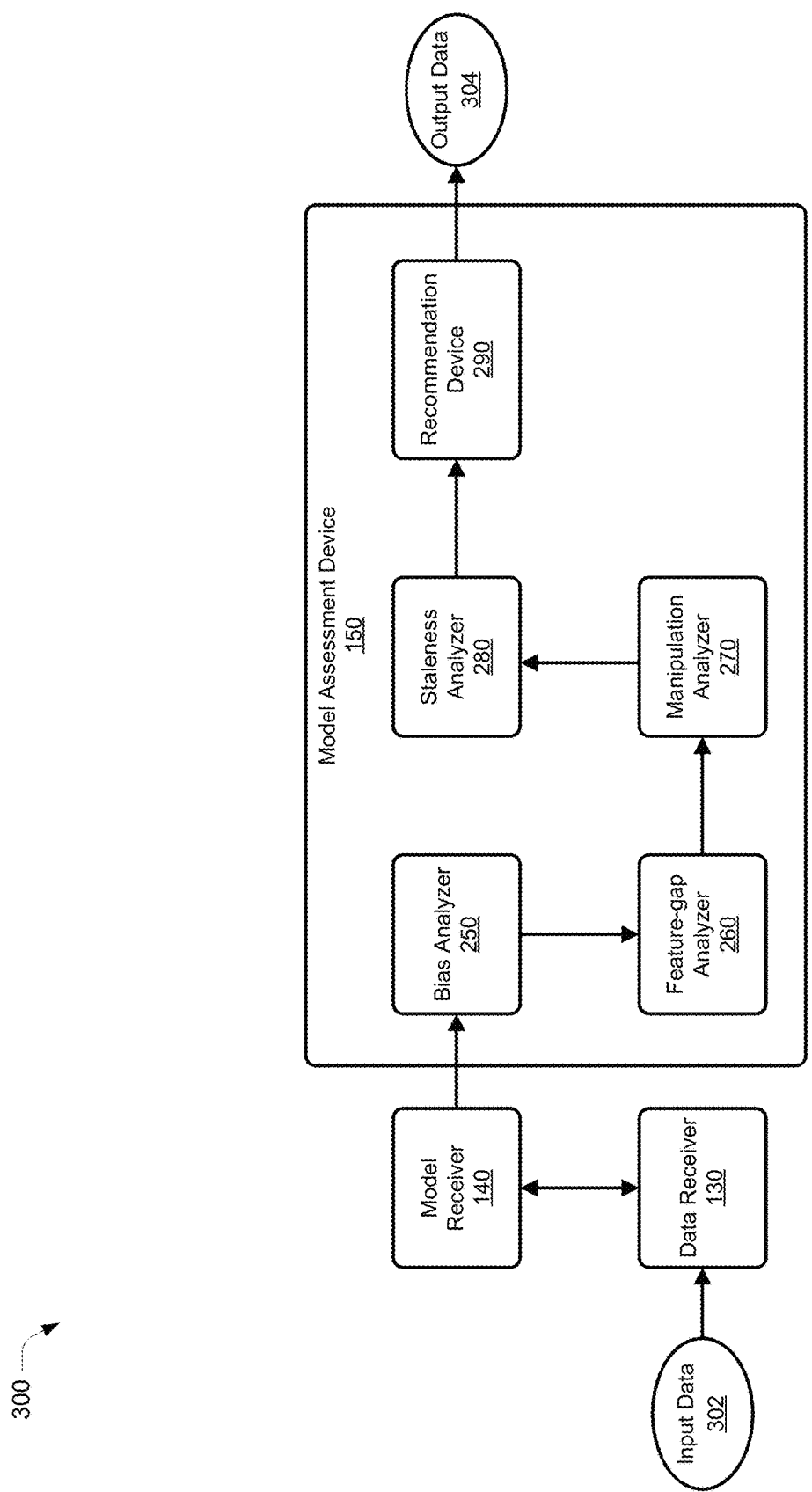
FIG. 3 illustrates an architecture for the system of FIG. 1, according to an example embodiment of the present disclosure.

FIG. 2 illustrates components of the system 110 of FIG. 1, according to an embodiment of the present disclosure. The system 110 may include one or more components that may enable assessing a data model based on a relevance of data interacting therewith. The data model may be assessed by calculating a veracity score of the data model based on an aspect of the data, such as an input feature, where the aspect may provide a measure of relevance of the data. The components may also assist to improve the veracity of the data model and manipulate the training data to re-train the data model for improving the veracity thereof. For example, the system 110 may include the processor 120 coupled to one or more components such as the data receiver 130, the model receiver 140, and the model assessment device 150. One having ordinary skill in the art would understand that the system 110 and/or the components described herein are examples and that similar or additional systems and/or components may be employed for performing the functionalities related thereto described in the present disclosure. The components are discussed in conjunction with an architecture 300 for the system 110 illustrated in FIG. 3. The architecture 300 provides a workflow for the components during operation. However, any other suitable architecture 300 may be contemplated based on the embodiments and concepts described in the present disclosure. It will also be appreciated that one or more of the components may operate in communication with each other irrespective of the workflow as illustrated or otherwise, for performing any of the operations discussed herein.

In an embodiment, the data receiver 130 may receive input data such as input data 302 from a data repository, a user device, and/or a computer readable medium over a network (not shown) via any suitable interfaces and/or devices of the system 110. Examples of the data repository may include, but are not limited to, a Structured Query Language (SQL) database, a file system, a non-SQL database, a streaming application programming interface (API), and a cloud system. The network may include any software, hardware, or computer applications capable of providing a medium to exchange signals or data in any format known in the art, related art, or developed later. The network may include, but is not limited to, a website, a social media platform, a unified communication application, and a stand-alone application. Examples of the social media platform may include, but are not limited to, Twitter™, Facebook™, Skype™, Microsoft Lync™, Cisco Webex™, and Google Hangouts™. Further, the network may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), Wi-Fi, radio, television, cable, satellite, and/or any other delivery or tunneling mechanism for carrying data. The network may include multiple networks or sub-networks, each of which may include, e.g., a wired or wireless data pathway. The network may include a circuit-switched voice network, a packet-switched data network, or any other network configurable to carry electronic communications. For example, the network may include networks based on the Internet protocol (IP) or asynchronous transfer mode (ATM), and may support voice using, for example, VoIP, Voice-over-ATM, or other comparable protocols used for voice, video, and data communications.

The input data 302 may include model data related to a data model such as a data model 216. In some embodiments, the input data 302 may include the data model 216. In the present disclosure, the data model 216 may refer to a mathematical representation of a predefined task involving one or more parameters (or model parameters), one or more of which may correspond to a feature in the production data 212. In an example, the data model 216 may be a financial model for determining eligibility for a loan based on a credit history of an individual. In another example, the data model 216 may be a classification model to classify a product into a category of a product hierarchy based on a feature of the product. In yet another example, the data model 216 may be a market model for determining potential customers eligible for a phone data upgrade based on a voice call usage. In still another example, the data model 216 may be a sales model for determining potential customers eligible for credit rewards based on their service usage history and/or purchase history. The model parameters may include any suitable types of features depending on a purpose of the data model 216. Examples of these features may include, but not limited to, person name, income, age, credit score, and number of credit cards (e.g., for the financial model); product name, brand name, product type, and product price (e.g., for the classification model); subscription identity (ID), voice talk time per month, phone plan, and plan type (e.g., for the market model); and customer name, age, address, occupation, income, and marital status (e.g., for the sales model). The received model data may include training data 210, production data 212, and historical data 214. The training data 210 may refer to a dataset used for training the data model 216. The production data 212 may refer to a dataset that may be fed to the data model 216 during operation for obtaining an intended outcome. The historical data 214 may refer to a dataset comprising a previously provided outcome of the data model 216 based on the production data 212, or a portion thereof. In an embodiment, the data receiver 130 may associate an indicator, e.g., a tag or an update in a register, with the model data (hereinafter referred to as tagged model data) in the input data 302. The indicator may assist to differentiate the tagged model data from the data model 216 upon being received as a part of the input data 302. The tagged model data may also be parsed by the data receiver 130 to segregate the training data 210, the production data 212, and the historical data 214.

Further, the input data 302 may also include metadata 230 such as technical metadata and organizational metadata related to the data model 216. The technical metadata may relate to a description, a feature, a category, and/or a relationship related thereto. For example, the technical metadata may indicate one or more data processing constraints such as properties of a category and characteristics of a feature in a dataset. In another example, the technical metadata may indicate an extent and/or type of data that may be processed by the data model 216, including, but not limited to, broad records, high records, loose records, dense records, records containing text, or not, records containing variables of different types of data (e.g., numeric, ordinal, categorical, interpreted (e.g., date, time, text), etc.), records containing variables with different statistical properties (e.g., statistical properties with regard to missing values, Cardinality, distribution, etc. of a parameter), etc. Other examples may include the technical metadata indicating information related to a record or a file, including but not limited to, a filename; file size, file format, file checksum or digest, file extension, creation date/time (e.g., creation timestamp), a creation user, last modified date/time (e.g., manipulation timestamp), a last modified user, a file path or network location, dimensional information, including, without limitation, resolution(s) and pixel depth(s) of images or videos, duration(s) of audio and video recordings, encoding and/or compression mechanisms or formats, a source library, user-defined metadata tags, transcripts, embedded descriptions, copyright and other authorship and/or attribution data; source, including, without limitation, type of hardware used to create, edit, or record data, file or data access permissions, last access date/time (e.g., access timestamp), last access user, confidentiality information, and so on. In an instance, the technical metadata may indicate a technical application or industry domain (e.g., banking, e-commerce, telecom, sales, etc.) to which the historical data 214, and hence, the data model 216, may be related.

The organizational metadata may relate to organizational constraints (e.g., rules, policies, guidelines, notices, etc.) including internal and external control objectives. The internal control objectives may refer to a reliability of financial reporting, timely feedback on an achievement of operational or strategic goals, and compliance with laws and regulations. The external control objectives may refer or relate to short-term and long-term implications of decisions made in or by the organizations on organizational goals such as brand promotion, customer acquisition, loan disbursement, and product search optimization. The organizational metadata may define, or assist to define, preset conditions to modulate, e.g., maximize or minimize, an aspect (e.g., value, category, record, file, etc.) of an outcome of the data model 216 based on various predefined organizational constraints or conditions. In an instance, the organizational metadata may assist to define a preset condition corresponding to an external control objective such as a service level objective (e.g., maximize revenue, increase customer acquisition per month, maximize sales, etc.) for the data model 216. Further, the technical metadata and the organizational metadata may be associated with data model 216 and the tagged model data. The data receiver 130 may store the metadata in a computer readable medium accessible by the components of the system 110. The data receiver 130 may send the data model 216, if available, and the tagged model data including the segregated training data 210, the production data 212, and the historical data 214 to the model receiver 140.

In an embodiment, the model receiver 140 may receive the data model 216 and the tagged model data. The model receiver 140 may identify the tagged model data based on the indicator associated therewith. The tagged model data may be parsed to identify the training data 210, the production data 212, and the historical data 214 associated with the data model 216. The historical data 214 may include a previously determined outcome of the data model 216 based on the production data 212, or a portion thereof. The model receiver 140 may process the data model 216 to determine one or more features such as an input feature 218 in the production data 212 and determine a corresponding outcome of the data model 216 in the historical data 214. From the input data 302, the training data 210 may be stored in the computer readable medium accessible by the system 110. Further, the data model 216, the historical data 214 and the production data 212 may be sent to the model assessment device 150 by the model receiver 140.

In an embodiment, the model assessment device 150 may receive the data model 216, the historical data 214, and the production data 212 for processing to assess and/or improve the veracity of the data model 216. Veracity of a data model (hereinafter also referred to as model veracity) may refer an ability of a data model such as the data model 216 to provide an outcome in compliance with an organizational objective such as the internal control objective and/or the external control objective. The model veracity may depend on the veracity of data interacting therewith. Traditional solutions are typically directed towards creating a new data model for ensuring a corresponding veracity being higher than that of an existing data model; however, usually fail to determine the veracity of the existing data model. In an embodiment, the model assessment device 150 may provide to assess the veracity of an existing data model such as the data model 216 based on a relevance (e.g., bias, feature gap, manipulation, staleness, or a combination thereof) of data, such as the input feature 218, used by the data model 216 to provide an outcome (hereinafter referred to as first outcome 226) collated in the historical data 214.

To assess the data model 216, the model assessment device 150 may reuse the production data 212 including the input feature 218. The production data 212 may be used to identify a key feature 220 therein relative to the input feature 218. In an example, the key feature 220 may belong to the same type or category (e.g., age, income, address, brand name, etc.) of the input feature 218; however, other examples may include a type or category of the key feature 220 being different than that of the input feature 218. The model assessment device 150 may perform various operations to identify the key feature 220. For instance, in a first step, the model assessment device 150 may determine a target category 224 in the historical data 214. The target category 224 may refer to a category belonging to the first outcome in the historical data 214. The target category 224 may include one or more entries. In a second step, the model assessment device 150 may correlate each of the entries in the target category 224 with features in the production data 212 using any of a variety of techniques known in the art, related art, or developed later including decision tree algorithm, K-nearest neighbour algorithm, Genetic Evolution Algorithm, Entropy algorithm, Gini Index, and Local Outlier Factor (LOF) algorithm. The selected technique may determine a statistical distribution of each of the various features in the production data 212 that may be related to the target category 224. Out of the various correlated features, a feature having a statistical distribution nearest or closest to the input feature 218 in the production data 212 may be identified as the key feature 220. It will be appreciated that such an operation to identify a key feature such as the key feature 220 may be performed for various target categories associated with the first outcome 226; however, aspects of the present disclosure are discussed herein with respect to only the key feature 220 for the sake of brevity. The model assessment device 150 may store the identified key feature 220 in the computer readable medium, such as a memory, accessible by various components of the system 110. It will also be appreciated that, in some embodiments, the key feature 220 may be identified based on a probabilistic distribution thereof relative to that of the input feature 218 in the production data 212.

Once the key feature 220 is identified, the model assessment device 150 may obtain another outcome (hereinafter referred to as a second outcome 228) of the data model 216 based on the key feature 220. The second outcome 228 may be determined using any suitable component, e.g., a feature gap analyzer 260 discussed below, of the model assessment device 150. The second outcome 228 upon being different from the first outcome 226 (e.g., indicating a differential outcome), may trigger the model assessment device 150, or any components thereof, for determining a veracity score such as a veracity score 292 of the data model 216. The veracity score 292 may provide a measure of veracity of the data model 216.

In an embodiment, the model assessment device 150 may include a bias analyzer 250, the feature gap analyzer 260, a manipulation analyzer 270, a staleness analyzer 280, and a recommendation device 290 for assessing the veracity of the data model 216. The bias analyzer 250 may receive the input feature 218 and determine whether or not the input feature 218 may be causing the data model 216 to provide a biased outcome. The data model 216 may be deemed biased based on providing an outcome, such as the first outcome, which may be systematically prejudiced to deviate from one or more conditions preset based on organizational control objectives (e.g., internal control objectives and/or external control objectives) due to erroneous assumptions during a machine learning process. The erroneous assumptions may be caused due to a repeated appearance of the input feature 218 in the production data 212, or an absence thereof, in the training data 210 used to train the data model 216. The bias analyzer 250 may determine the input feature 218 that may be responsible for biasing the data model 216 based on the first outcome being variably dependent on the statistical distribution of the input feature 218 in the production data 212. Subsequently, the bias analyzer 250 may normalize the features in the production data 212 based on being determined as a biasing feature to calculate a bias factor 254, which may provide a degree of bias. For example, the bias analyzer 250 may assign a value '1' to the biasing feature, e.g., the input feature 218, and a value '0' to non-biasing features. As shown in an illustrated example of FIG. 4, for the financial model to determine a loan eligibility, the historical data 214 may include a target category 224 such as 'defaulters' (not shown), which may be correlated with input features related to input categories, namely, 'Age,' 'checkingstatus,' 'Amount,' 'Duration,' and 'Purpose' in the production data 212. Out of the correlated input features, the input features under the categories 'Age' and 'checkingstatus' may be determined as biasing features and hence, may be assigned a value '1' and the remaining features under other categories may be assigned a value '0.'

The bias analyzer 250 may also determine an importance value 252 of an input category 222 of each of the determined input features in the production data 212. The importance value 252 may be determined based on a technical application to which the historical data 214 and/or the data model 216 may pertain and a preset condition corresponding to a service level objective. The technical application may be determined from the technical metadata associated with the data model 216, e.g., based on underlying keywords. Similarly, the bias analyzer 250 may determine or set the preset condition based on the organizational metadata associated with the data model 216. For example, as illustrated in FIG. 4, the input categories, namely, 'Age,' 'checkingstatus,' 'Amount,' 'Duration,' and 'Purpose' may have determined importance values of 9%, 11%, 13%, 9%, and 9% respectively. Accordingly, the bias factor 254 may be calculated as a weighted average of bias, as shown in Equation 1.

$$\text{Bias Factor} = [(1 \times 9\%) + (1 \times 11\%) + (0 \times 13\%) + (0 \times 9\%) + (0 \times 9\%)] = 20\% \quad (1)$$

As shown in Equation 1, the bias factor 254 may be calculated as a sum of products of a normalized biasing value of each input category and a corresponding importance value. In another embodiment, the data model 216 may be re-trained by the bias analyzer 250. The bias analyzer 250, in communication with the recommendation device 290, may manipulate the training data 210 to include the first outcome, e.g., the target category 224 and values pertaining thereto. The data model 216 may then be re-trained based on the manipulated training data 294 using any of a variety of techniques known in the art, related art, or developed later including Entropy algorithm and Gini Index. The re-trained data model may provide a third outcome based on the production data 212. In some instances, the third outcome may provide data that is being split by a feature indicating a point at which the third outcome becomes biased. Subsequently, the bias analyzer 250 may send the calculated bias factor 254 to the recommendation device 290. The bias analyzer 250 may also send the first outcome 226, the second outcome 228 and the target category 224 related to the input feature 218 to the feature gap analyzer 260.

Figure 5:
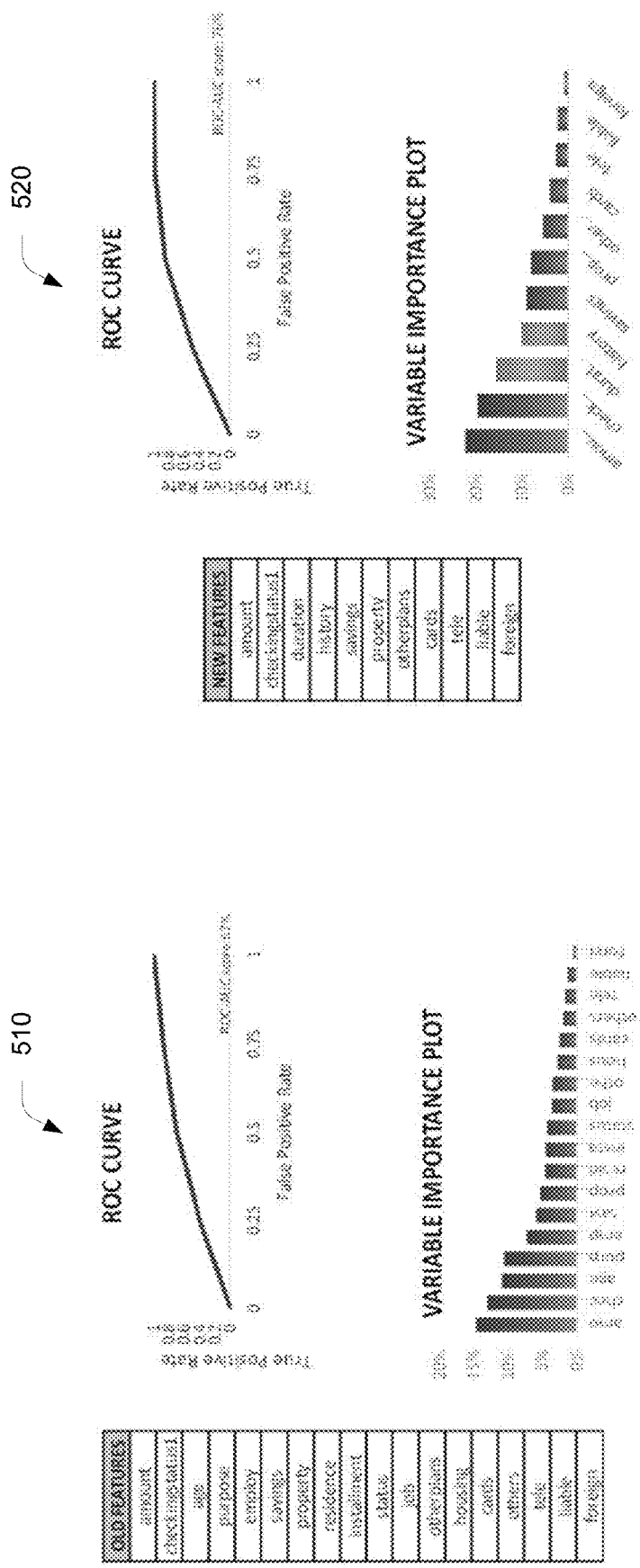
FIG. 5 illustrates a performance measure of a data model based on a feature gap in data, according to an example embodiment of the present disclosure.

In an embodiment, the feature gap analyzer 260 may calculate a first performance measure 262 and a second performance measure 264 of the data model 216 based on the first outcome 226 and the second outcome 228 respectively. The feature gap analyzer 260 may calculate any suitable performance measure based of the technical application to which the historical data 214 may pertain. Examples of the performance measure may include, but are not limited to, a false negative rate, a classification specificity score, a classification sensitivity score, and a classification accuracy score. The feature gap analyzer 260 may determine a feature gap factor 266 based on an absolute difference between the first performance measure 262 and the second performance measure 264 being non-zero. For instance, as shown in an example illustrated in FIG. 5, the feature gap analyzer 260 may calculate a receiver operating characteristic (ROC) curve value for the "OLD FEATURES" corresponding to the first outcome 226 and "NEW FEATURES" corresponding to the second outcome 228. The ROC curve 510 for the first outcome 226 provides a first score of 67%, which increased to a second score 76% for the second outcome 228 indicated by the ROC curve 520. Hence, the feature gap factor 266 may be calculated as an absolute difference between the first score and the second score as shown in Equation 2.

$$\text{Feature Gap Factor} = |(\text{first score}) - (\text{second score})| = |67 - 76| = 9\% \quad (2)$$

In another embodiment, the feature gap analyzer 260 may also calculate a feature gap index 268 based on a probability of classifying the input feature 218 in a most relevant category relative to a correct category, such that the most relevant category may correspond to the target category 224. For instance, in the illustrated example of FIG. 5, if the correct category corresponds to 100%, the feature gap index 268 may be calculated for each of the first outcome and the second outcome 228, as shown in Equations 3 and 4.

$$\text{Feature Gap Index (first outcome)} = (100 - \text{first score}) \quad (3)$$
$$= (100 - 67)$$
$$= 33\%$$

-continued $$\text{Feature Gap Index (second outcome)} = (100 - \text{first score}) \quad (4)$$
$$= (100 - 76)$$
$$= 24\%$$

Based on Equations 2-4, lower the feature gap factor 266 (or the feature gap index 268), higher is the accuracy of an outcome of the data model 216. Subsequently, the feature gap analyzer 260 may send the calculated feature gap factor 266 to the recommendation device 290. The feature gap analyzer 260 may also send the production data 212, the input feature 218, and the key feature 220 to the manipulation analyzer 270.

Figure 6:
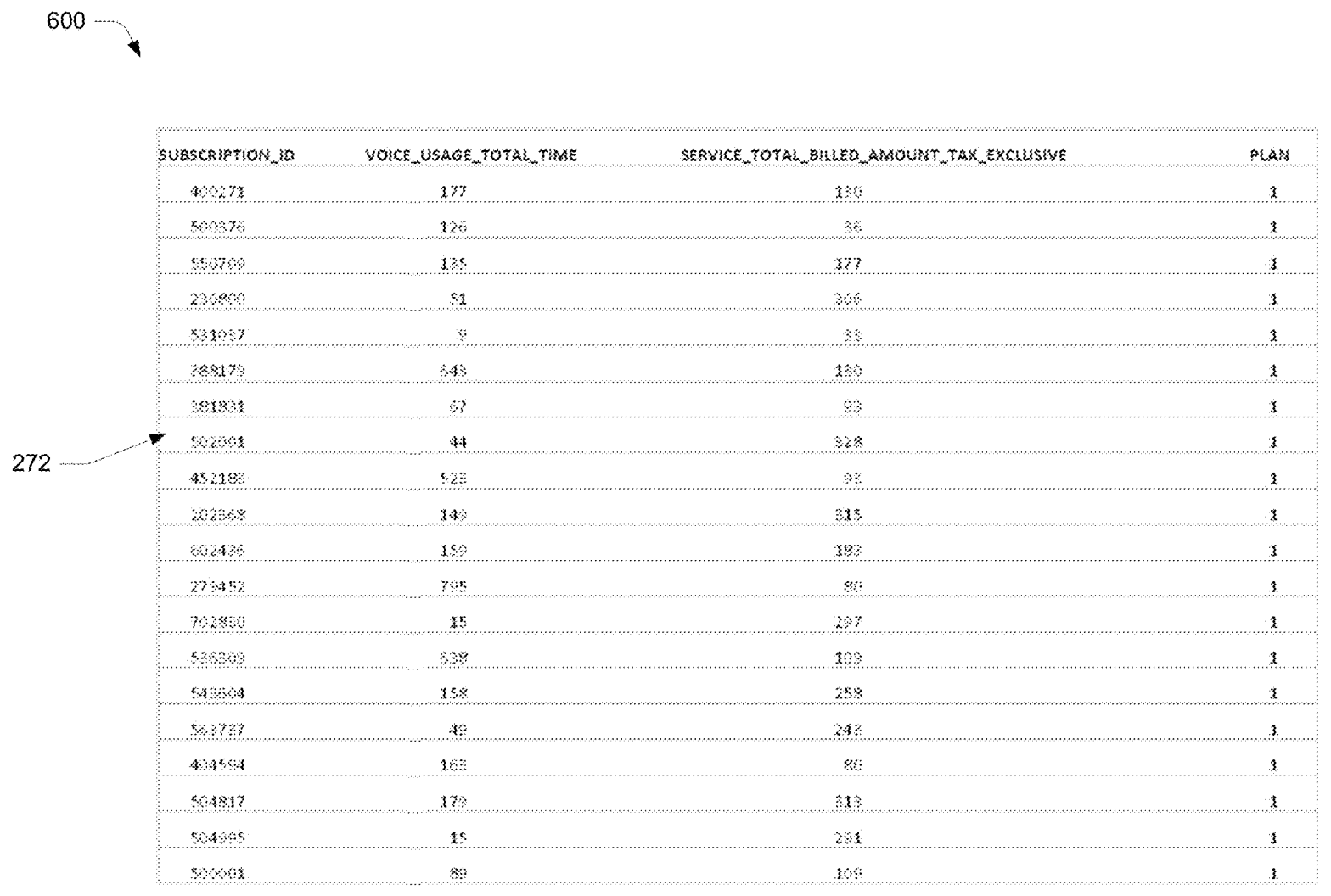
Figure 7:
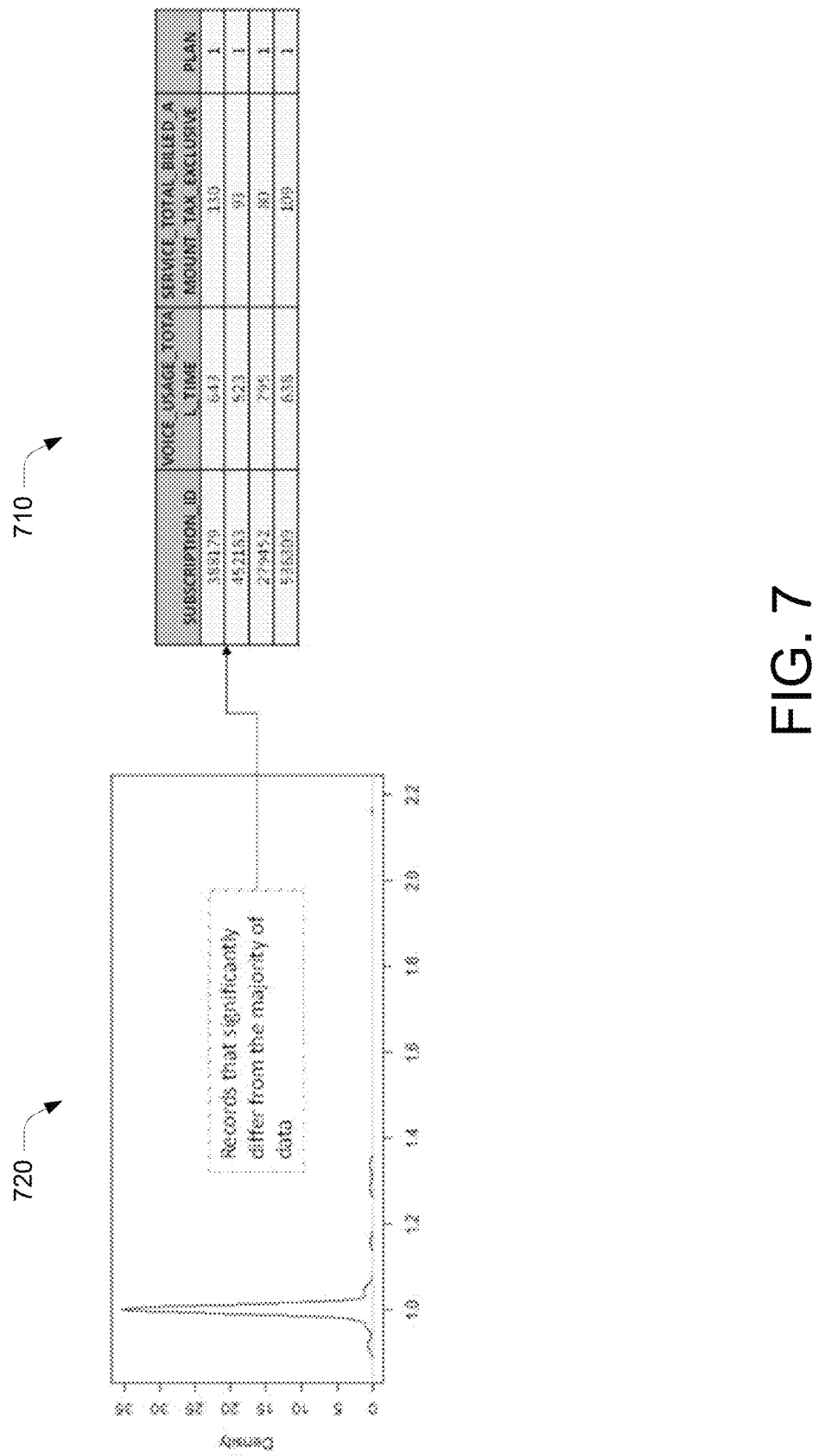
FIG. 7 illustrates a density distribution of the manipulated data of FIG. 6, according to an example embodiment of the present disclosure.

In an embodiment, the manipulation analyzer 270 may determine whether or not the input feature 218 is manipulated based on a set of features including the input feature 218 and the key feature 220 in the production data 212. The input feature 218 may be determined as a manipulated input feature based on the statistical distribution of the input feature 218 being different from that of a predefined number of neighboring features such as a neighboring feature 272 in the set. The neighboring features include the key feature 220 in the set. In some instances, the neighboring feature 272 is the key feature 220. Such relative statistical distribution may be determined using any of a variety of techniques known in the art, related art, or developed later including the LOF algorithm. For example, as illustrated in FIG. 6, the production data 212 may include a table 600 having various features under corresponding input categories, namely, "SUBSCRIPTION_ID," "VOICE_USAGE_TOTAL_TIME," "PLAN," and "SERVICE_TOTAL_BILLED_AMOUNT_TAX_EXCLUSIVE." Based on a statistical distribution of each input feature 218 under these input categories relative to that of the neighbouring features such as the neighboring feature 272, the manipulation analyzer 270 may isolate the input features, such as the features shown in table 710 of FIG. 7, which may be identified as being manipulated. As illustrated in a graph 720, the manipulated features may have a local density being substantially different (e.g., above 50%) from that of their neighbors. In some instances, the manipulated features may be determined relative to one or more features belonging an input category having a relatively higher importance value such as the importance value 252. Upon determining the manipulated features, the manipulation analyzer 270 may calculate a manipulation factor 274 as a ratio of a total number of manipulated input features and a total number of features in the set including the key feature 220. The manipulation factor 274 may be calculated as shown in Equation 5.

$$\text{Manipulation factor} = \frac{\text{Total Number of Manipulated Features}}{\text{Total Number of Features in the set}} \quad (5)$$

Figures 8, 9, 10:
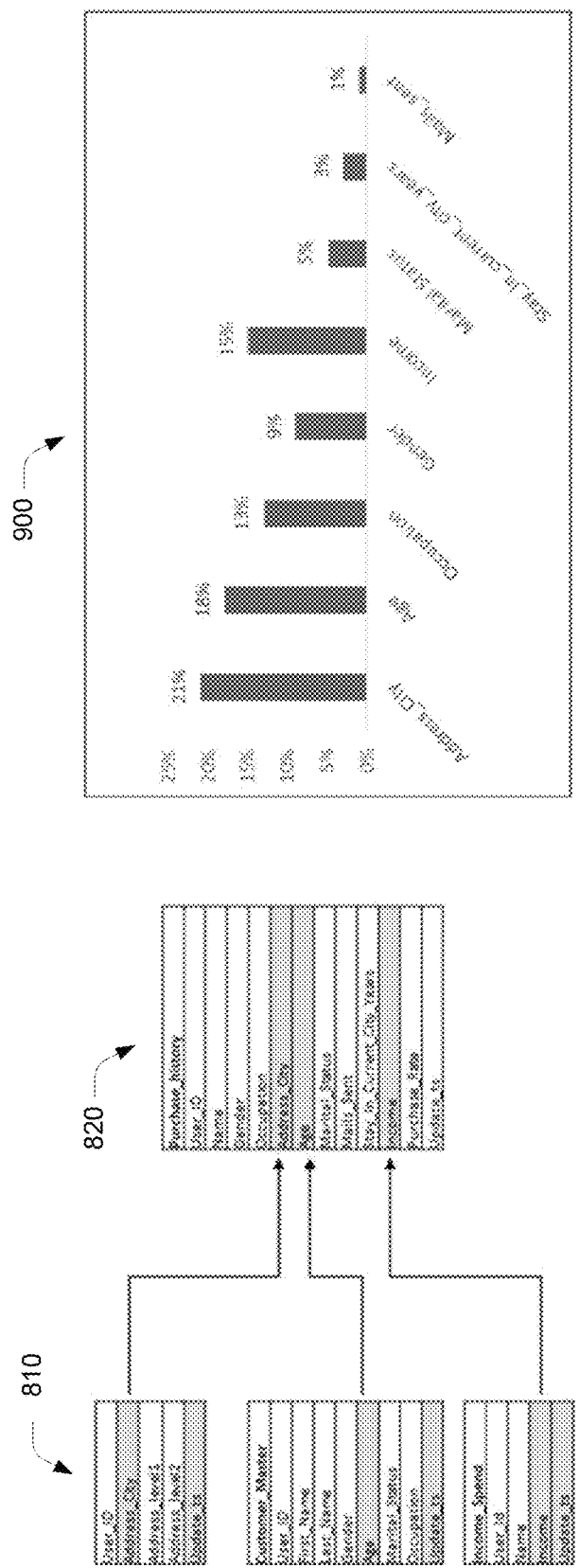
FIG. 8 illustrates tables including data categories for being used by a data model, according to an example embodiment of the present disclosure.
FIG. 9 illustrates importance values of the data categories for being used by the data model of FIG. 8, according to an example embodiment of the present disclosure.
FIG. 10 illustrates a table to calculate a staleness factor of data in the data categories of FIG. 8, according to an example embodiment of the present disclosure.

Subsequently, the manipulation analyzer 270 may send the calculated manipulation factor 274 to the recommendation device 290. The manipulation analyzer 270 may also send the production data 212 including the input feature 218 and the key feature 220 to the staleness analyzer 280. In an embodiment, the staleness analyzer 280 may perform various operations to determine whether or not the input feature 218 is stale or needs an update, and accordingly calculate a staleness factor 288. In a first step, the staleness analyzer 280 may determine the input feature 218 as being a target feature based on the importance value 252 of the input category 222 in the production data 212 corresponding to the input feature 218. As illustrated in FIG. 8, the production data 212 may include a set of one or more input tables 810 including input categories, namely, "User_ID," "Address_city," "First Name," "Last Name," "Gender," "Age," "Marital Status," "Occupation," and "Income" The set of input tables 810 may be processed by the data model 216 to provide an outcome, such as the first outcome 226, including an output table 820 including one or more of the input categories and/or additional categories such as "Mails_Sent," "Stay_In_Current_City_Years," and "Purchase_Rate." The staleness analyzer 280 may determine the input categories (e.g., "Address_city," "Income," "age," "occupation," and "gender") related to the outcome and determine importance values, such as the importance value 252, of the input categories. As illustrated in a graph 900 in FIG. 9, the importance values (e.g., 21% for "Address_city" and 15% for "Income" in FIG. 9) may be determined based on the metadata 230 (e.g., technical metadata) corresponding to the technical application to which the historical data 214 and/or the data model 216 may pertain and a preset condition corresponding to a service level objective, as discussed above for the bias analyzer 250. In a second step, the staleness analyzer 280 may determine whether the input feature 218 in the production data 212 is the target feature based on a preset importance threshold value. For example, the staleness analyzer 280 may determine the input feature 218 as the target feature (e.g., "Address_city" and "Income" in FIG. 8) if the importance value 252 of the input category 222 exceeds a preset importance threshold value 282. The importance threshold value 282 may be predefined or dynamically defined based on the technical application or a purpose of the data model 216.

In a third step, the staleness analyzer 280 may determine a timestamp 284 associated with the determined target features and a time threshold value 286 associated with the input category. The time threshold value 286 may also be predefined or dynamically defined based on the technical application or a purpose of the data model 216. In a fourth step, the staleness analyzer 280 may determine the target feature (e.g., "Address_city" and "Income" in FIG. 8) as being stale based on the timestamp 284 exceeding the time threshold value 286. In a fifth step, the staleness analyzer 280 may normalize the target features in the production data 212 based on being determined as stale features to calculate the staleness factor 288 that may provide a measure of staleness of the target features. For example, for normalization, the staleness analyzer 280 may assign a value '1' to the stale feature, e.g., the target feature, and a value '0' to non-stale features. As shown in an example table 1000 illustrated in FIG. 10, a target category 224 such as "purchase history" (shown in FIG. 8) may be correlated with the target features related to input categories, namely, "Address_city," "Income," "age," "occupation," and "gender" in the production data 212. Out of the correlated target features, the input features under the categories "Address_city" and "Income" may be determined as stale features and hence, may be assigned a value '1' and the features under other input categories may be assigned a value '0.' In a sixth step, the staleness analyzer 280 may calculate a staleness factor 288 based on the stale target feature(s) and the determined importance value 252 of the input category(ies) corresponding to the stale target feature(s). Accordingly, based on the example of FIG. 10, the staleness factor 288 may be calculated as a weighted average of staleness, as shown in Equation 6.

$$\text{Staleness Factor} = [(1 \times 21\%) + (1 \times 15\%) + (0 \times 18\%) + \quad (6)$$
$$(0 \times 13\%) + (0 \times 9\%)]$$
$$= 36\%$$

As shown in Equation 6, the staleness factor 288 may be calculated as a sum of products of a normalized staleness value of each input category and a corresponding importance value. In some instances, the staleness analyzer 280 may remove the stale target feature from the set in the production data 212. Upon determining the stale target features, the staleness analyzer 280 may send the calculated staleness factor 288 to the recommendation device 290.

In an embodiment, the recommendation device 290 may receive the calculated bias factor 254, the feature gap factor 266, the manipulation factor 274, the staleness factor 288, and the training data 210. The recommendation device 290 may calculate a veracity score 292 of the data model 216 based on the bias factor 254, the feature gap factor 266, the manipulation factor 274, and the staleness factor 288, or any combinations thereof. The veracity score 292 may provide the measure of veracity for assessing the data model 216. Hence, the veracity score 292 indicates a combined impact (or relevance) of the data interacting with the data model 216. Further, the recommendation device 290 may manipulate or update the training data 210 to include the key feature 220, the first outcome 226, the second outcome 228, the production data 212 after removing the manipulated feature(s) and/or the stale target feature(s) therefrom to provide the manipulated training data 294. The recommendation device 290 may also provide a recommendation 296 to re-train the data model 216 based on the manipulated training data 294 for improving the veracity of the data model 216. In some embodiments, the recommendation device 290 may also assist to re-train the data model such as the data model 216 using the manipulated training data 294. The recommendation, the determined key feature 220, and the calculated veracity score 292 of the data model 216 may be provided as output data 304 for user review. The output data 304 may be sent to any output component of the system 110.

Figure 11:
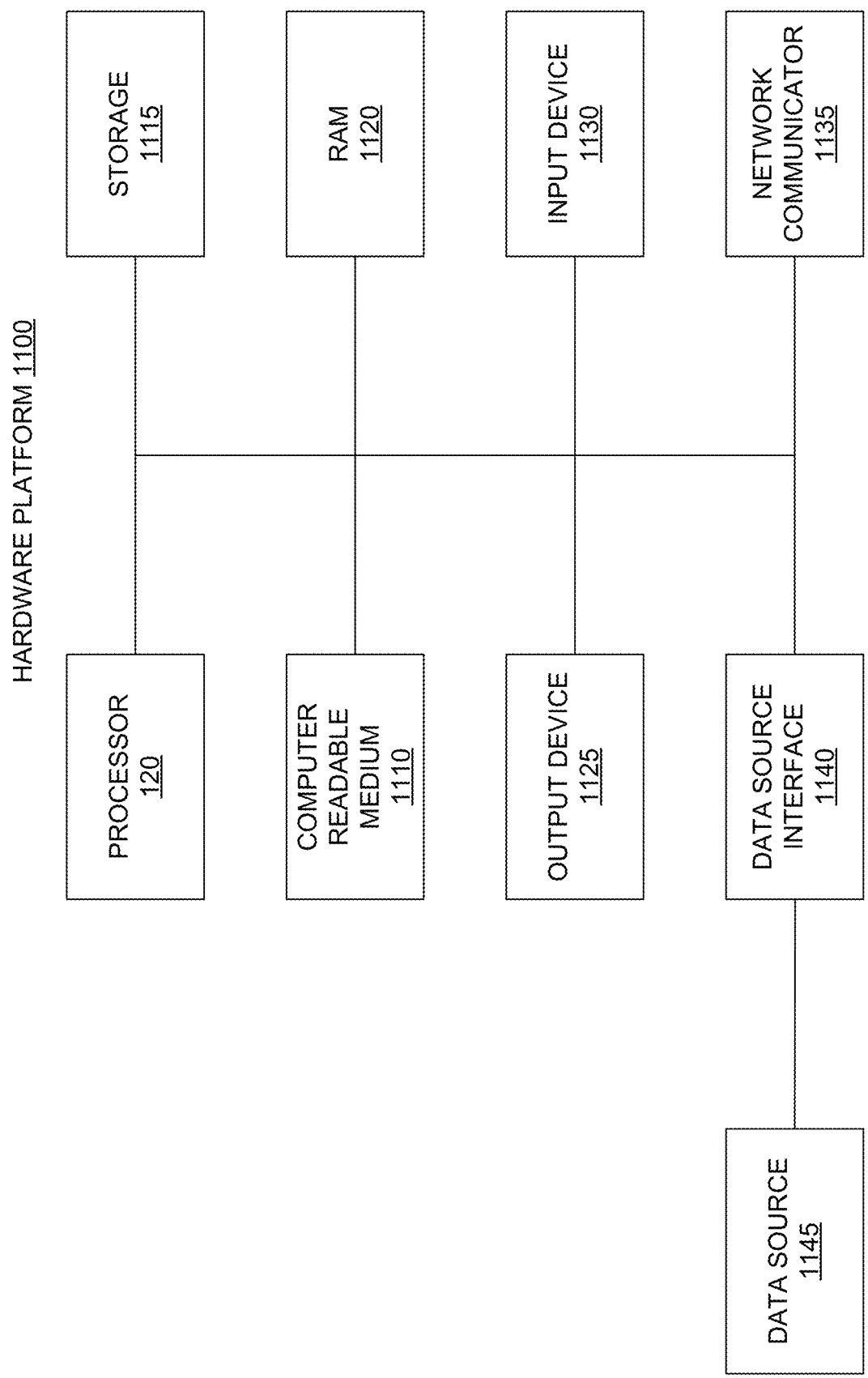
FIG. 11 illustrates a hardware platform for an implementation of the system of FIG. 1, according to an example embodiment of the present disclosure.

FIG. 11 illustrates a hardware platform 1100 for the implementation of the system 110 of FIG. 1, according to an embodiment of the present disclosure. For the sake of brevity, construction and operational features of the system 110 which are explained in detail above are not explained in detail herein. Particularly, computing machines such as but not limited to internal/external server clusters, quantum computers, desktops, laptops, smartphones, tablets, and wearables which may be used to execute the system 110 or may have the structure of the hardware platform 1100. As illustrated, the hardware platform 1100 may include additional components not shown and that some of the components described may be removed and/or modified. For example, a computer system 110 with multiple GPUs may be located on external-cloud platforms including Amazon Web Services, or internal corporate cloud computing clusters, or organizational computing resources, etc.

The hardware platform 1100 may be a computer system such as the system 110 that may be used with the embodiments described herein. For example, the computer system 110 may represent a computational platform that includes components that may be in a server or another computer system 110. The computer system 110 may execute, by a processor such as the processor 120 (e.g., a single or multiple processors) or other hardware processing circuit, the methods, functions and other processes described herein. These methods, functions and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system 110 may include the processor 120 that executes software instructions or code stored on a non-transitory computer-readable storage medium 1110 to perform methods of the present disclosure. The software code includes, for example, instructions to gather data and documents and analyze documents. In an example, the bias analyzer 250, the feature gap analyzer 260, the manipulation analyzer 270, the staleness analyzer 280, and the recommendation device 290 may be software codes or components performing these steps.

The instructions on the computer-readable storage medium 1110 are read and stored the instructions in storage 1115 or in random access memory (RAM). The storage 1115 may provide a space for keeping static data where at least some instructions could be stored for later execution. The stored instructions may be further compiled to generate other representations of the instructions and dynamically stored in the RAM such as RAM 1120. The processor 120 may read instructions from the RAM 1120 and perform actions as instructed.

The computer system 110 may further include an output device 1125 to provide at least some of the results of the execution as output including, but not limited to, visual information to users, such as external agents. The output device 1125 may include a display on computing devices and virtual reality glasses. For example, the display may be a mobile phone screen or a laptop screen. GUIs and/or text may be presented as an output on the display screen. The computer system 110 may further include an input device 1130 to provide a user or another device with mechanisms for entering data and/or otherwise interact with the computer system 110. The input device 1130 may include, for example, a keyboard, a keypad, a mouse, or a touchscreen. Each of these output device 1125 and input device 1130 may be joined by one or more additional peripherals. For example, the output device 1125 may be used to display results of the bias analyzer 250, the feature gap analyzer 260, the manipulation analyzer 270, the staleness analyzer 280, and/or the recommendation device 290.

A network communicator may be provided to connect the computer system 110 to a network and in turn to other devices connected to the network including other clients, servers, data stores, and interfaces, for instance. A network communicator may include, for example, a network adapter such as a LAN adapter or a wireless adapter. The computer system 110 may include a data source interface 1140 to access any data source such as a data source 1145, which may be an information resource. As an example, a database of exceptions and rules may be provided as the data source 1145. Moreover, knowledge repositories and curated data may be other examples of the data source 1145.

Figure 12:
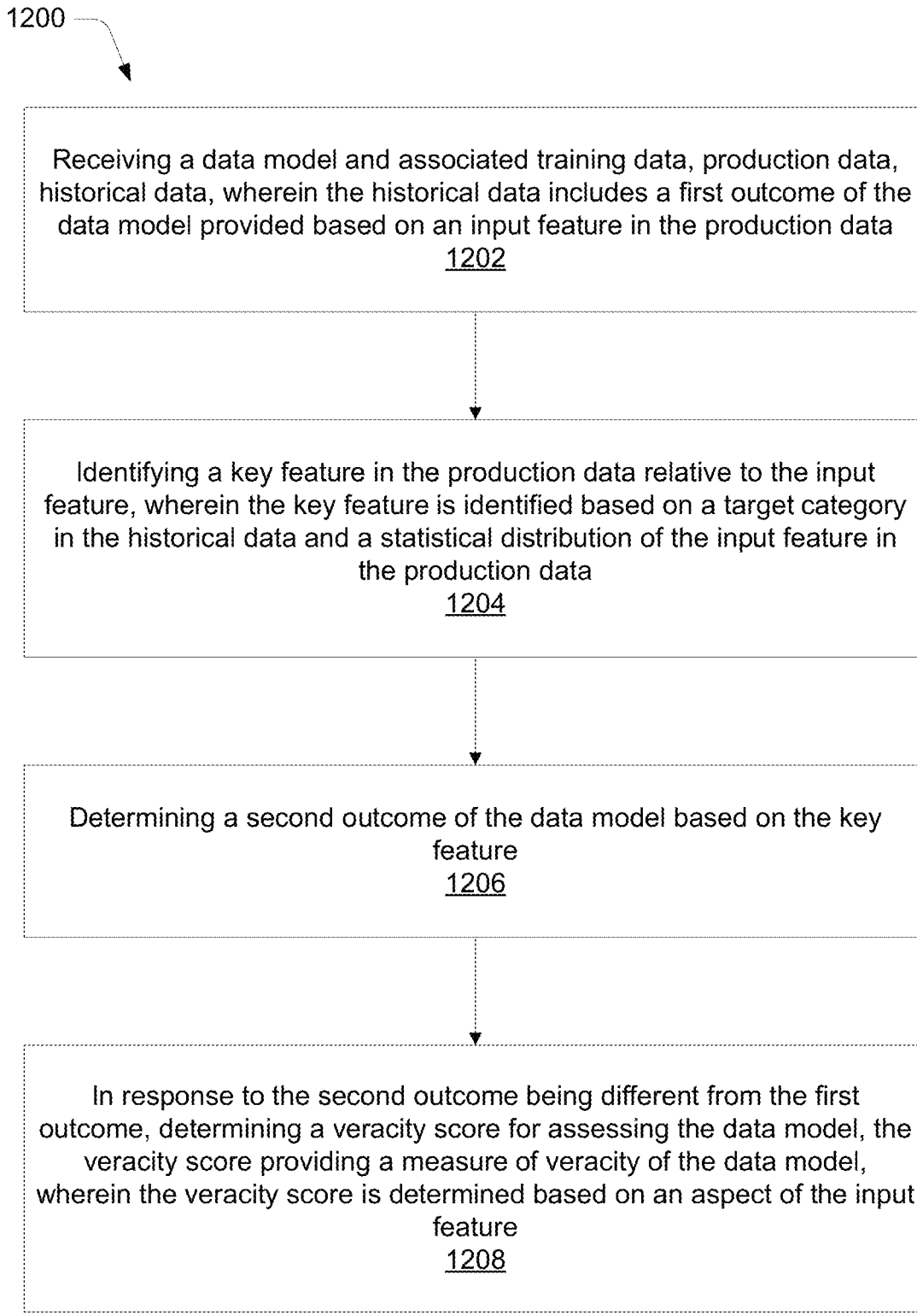
FIG. 12 illustrates a method for assessing veracity of a data model based on data relevance, according to an example embodiment of the present disclosure.

FIG. 12 illustrates a method for assessing veracity of a data model based on data relevance, according to an example embodiment of the present disclosure. The method 1200 may be described in the general context of computer executable instructions. Generally, computer executable instructions may include routines, programs, objects, components, data structures, procedures, modules, functions, and the like that perform particular functions or implement particular abstract data types. The computer executable instructions may be stored on a computer readable medium, and installed or embedded in an appropriate device for execution.

The order in which the method 1200 is described is not intended to be construed as a limitation, and any number of the described method blocks may be combined or otherwise performed in any order to implement the method 1200, or an alternate method. Additionally, individual blocks may be deleted from the method 1200 without departing from the spirit and scope of the present disclosure described herein. Further, the method 1200 may be implemented in any suitable hardware, software, firmware, or combination thereof, that exists in the related art or that is later developed.

The method 1200 describes, without limitation, an implementation of the system 110. A person of skill in the art will understand that the method 1200 may be modified appropriately for implementation in various manners without departing from the scope and spirit of the disclosure. The method 1200 may be implemented, in at least some embodiments, by the model assessment device 150 of the system 100. For example, the model assessment device 150 may use the processor(s) to execute computer instructions to perform operations for assessing the veracity of a data model such as the data model 216.

At step 1202, a data model and input data associated therewith including training data 210, production data 212, and historical data 214 may be received, e.g., by the model assessment device 150. The data model such as the data model 216 may refer to a mathematical representation of a predefined task involving one or more parameters (or model parameters), one or more of which may correspond to a feature in the production data 212. The input data may also include metadata such as technical metadata and organizational metadata related to the data model 216. The data model 216, and the historical data 214, may be related to a technical application as indicated by the metadata 230. The historical data 214 may include a first outcome 226 of the data model 216 provided based on one or more features such as an input feature 218 in the production data 212. The model assessment device 150 may process the input data to assess and/or improve the veracity of the data model 216. The model veracity may depend on veracity of data interacting therewith. Accordingly, the model veracity may be assessed based on a relevance (e.g., indicated by bias, feature gap, manipulation, staleness, or a combination thereof) of data, such as the input feature 218.

At step 1204, a key feature in the production data may be identified. The key feature such as the key feature 220 may be identified relative to the input feature 218 based on a target category such as the target category 224 in the historical data 214 and a statistical distribution of the input feature 218 in the production data 212. The key feature 220 may belong to the same type or category of the input feature 218; however, in some instances, a type or category of the key feature 220 may be different than that of the input feature 218. The target category 224 may be a category belonging to the first outcome in the historical data 214. The target category 224 may be correlated with features in the production data 212 using any of a variety of techniques known in the art, related art, or developed later including decision tree algorithm, K-nearest neighbour algorithm, Genetic Evolution Algorithm, Entropy algorithm, Gini Index, and Local Outlier Factor (LOF) algorithm. From the correlated features, a feature that may have a statistical distribution nearest or closest to the input feature 218 in the production data 212, may be identified as the key feature 220.

At step 1206, a second outcome of the data model such as the data model 216 may be determined. The second outcome such as the second outcome 228 may be determined based on the identified key feature 220. At step 1208, a veracity score may be determined for assessing the data model such as the data model 216. Upon determining the second outcome 228 being different from the first outcome 226, a veracity score such as the veracity score 292 may be determined for assessing the data model. The veracity score 292 provides a measure of veracity of the data model 216 and may be determined based on one or more aspects (e.g., bias factor 254, feature gap factor 266, manipulation factor 274, and staleness factor 288) of the data model 216. To determine the bias factor 254, whether or not the input feature 218 is causing the data model 216 to bias may be determined. The input feature 218 may be determined as a biasing feature, e.g., by the bias analyzer 250, based on the first outcome 226 being variably dependent on the statistical distribution of the input feature 218 in the production data 212. The biasing feature may be normalized by assigning a value '1' thereto while assigning a value '0' to the non-biasing features. Further, an importance value such as the importance value 252 of the input category of the biasing feature may be determined based on a technical application to which the historical data 214 and/or the data model 216 may pertain and a preset condition corresponding to a service level objective. Accordingly, the bias factor 254 may be calculated as a weighted average of bias based on the normalized biasing feature and the importance value of the corresponding input category.

To determine the feature gap factor 266, the first performance measure 262 and the second performance measure 264 of the data model 216 may be calculated, e.g., by the feature gap analyzer 260, based on the first outcome 226 and the second outcome 228 respectively. Accordingly, the feature gap factor 266 may be determined based on an absolute difference between the first performance measure 262 and the second performance measure 264. To determine the manipulation factor 274, whether or not the input feature 218 has been manipulated may be determined, e.g., by the manipulation analyzer 270. The manipulation of the input feature 218 may be determined based on the statistical distribution of the input feature 218 being substantially different (e.g., above 50%) from that of a predefined number of neighboring features such as a neighboring feature 272 in the production data 212. The manipulated feature(s) may have a local density substantially different (e.g., above 50%) from that of their neighbors in the production data 212. Accordingly, the manipulation factor 274 may be determined as a ratio of a total number of manipulated input features and a total number of features in a set including the key feature 220 in the production data 212.

To determine the staleness factor 288, whether or not the input feature 218 is a target feature may be determined, e.g., by the staleness analyzer 280. The input feature 218 may be determined as a target feature based on the importance value 252 of the input category 222 in the production data 212 corresponding to the input feature 218. The importance value 252 may be determined based on the metadata 230 (e.g., technical metadata) corresponding to the technical application to which the historical data 214 and/or the data model 216 may pertain and a preset condition corresponding to a service level objective, as discussed above. If the importance value 252 exceeds a predefined or dynamically defined importance threshold value such as the threshold value 282, the input feature 218 may be determined as the target feature. Subsequently, a timestamp such as the timestamp 284 associated with the determined target feature may be determined. If the timestamp 284 exceeds a predefined time threshold value such as the time threshold value 286, the target feature may be determined as a stale target feature. The stale target feature may be normalized by assigning a value '1' thereto while assigning a value '0' to the remaining features or the non-stale target features. Accordingly, the staleness factor 288 may be determined based on the normalized target feature and the determined importance value 252 of the input category of the stale target feature (i.e., the normalized target feature).

The veracity score 292 calculated based on the bias factor 254, the feature gap factor 266, the manipulation factor 274, the staleness factor 288, and the training data 210 may be outputted for user review, e.g., by the recommendation device 290. Further, the training data 210 may be manipulated or updated to include the key feature 220, the first outcome 226, the second outcome 228, the production data 212 after removing the manipulated feature(s) and/or the stale target feature(s) therefrom, or a combination thereof, to provide the manipulated training data 294. A recommendation such as the recommendation 296 to re-train the data model 216 based on the manipulated training data 294 may also be outputted for improving the veracity of the data model 216.

The present disclosure provides for the system 110 that may assess the veracity of the data model 216 based on a relevance of data interacting therewith for providing an outcome. The present disclosure may assess the data model 216 based on the veracity score 292 associated therewith. The veracity score 292 may be calculated based on one or more aspects, i.e., bias factor 254, feature gap factor 266, manipulation factor 274, staleness factor, or a combination thereof, of the data (e.g., input feature 218) providing a measure of relevance of the data processed by the data model 216. The present disclosure may also provide to assess a combined impact of these data aspects on the data model 216. Further, the present disclosure may assist to improve or enhance the veracity of the data model 216 and update the training data 210 to retrain the data model 216 for improving the veracity thereof.

One of ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

We claim:

1. A system for veracity assessment of a machine-learning data model comprising:
   a processor;
   a data receiver coupled to the processor, the data receiver to receive training data, historical data, and production data;
   a model receiver coupled to the processor, the model receiver to receive the machine-learning data model associated with the historical data and trained using the training data, the historical data comprising a first outcome of the machine-learning data model, wherein the first outcome is provided based on an input feature in the production data; and
   a model assessment device coupled to the processor, the model assessment device to:
      identify a key feature in the production data relative to the input feature, wherein the key feature is identified based on a target category in the historical data and a statistical distribution of the input feature in the production data,
      determine a second outcome of the machine-learning data model based on the key feature, and
      in response to the second outcome being different from the first outcome, determine a veracity score for assessing the machine-learning data model, the veracity score providing a measure of veracity of the machine-learning data model, wherein the veracity score is determined based on an aspect of the input feature;
   wherein the model assessment device further includes:
      a bias analyzer to:
         determine the input feature as biasing the machine-learning data model based on the first outcome being variably dependent on the statistical distribution of the input feature in the production data;
      determine an importance value of an input category of the input feature in the production data based on metadata corresponding to a technical application to which the historical data pertains and a preset condition corresponding to a service level objective; and
      calculate a bias factor based on the input feature and the determined importance value of the input category, wherein the bias factor provides a degree of bias caused by the input feature;
      a feature-gap analyzer to:
         calculate a first performance measure of the machine-learning data model based on the first outcome;
         calculate a second performance measure of the machine-learning data model based on the second outcome;
         determine a feature gap factor based on an absolute difference between the first performance measure and the second performance measure being non-zero; and
         calculate a feature gap index based on a probability of classifying the input feature in a most relevant category, wherein the most relevant category corresponds to the target category;
      a manipulation analyzer to;
         determine a manipulation of the input feature based on a set of features comprising the input feature and the key feature in the production data, the input feature is determined as a manipulated input feature based on the statistical distribution of the input feature being different from that of at least one neighboring feature in the set, wherein the at least one neighboring feature includes the key feature; and
         calculate a manipulation factor based on the manipulated input feature and a total number of features in the set including the key feature;
      a staleness analyzer to:
         determine the input feature as being a target feature based on the importance value of the corresponding input category, wherein the input feature is the target feature in the set if the importance value of the input category exceeds a preset importance threshold value;
determine a timestamp associated with the target feature and a time threshold value associated with the target category;
determine the target feature as being stale based on the timestamp being less than the time threshold value, wherein the stale target feature is removed from the set; and
calculate a staleness factor based on the target feature and the determined importance value of the corresponding input category; and
a recommendation device to:
determine the veracity score based on the bias factor, the feature gap factor, the manipulation factor, and the staleness factor;
update the training data to include the key feature, the first outcome, the second outcome, and the production data after removing at least one of the manipulated input feature and the stale target feature to improve the veracity of the machine-learning data model; and
recommend to re-train the machine-learning data model based on the updated training data for improving the veracity of the machine-learning data model.

2. The system as claimed in claim 1, further comprising an output device coupled to the processor, the output device to output at least one of the recommendation to re-train the machine-learning data model, the key feature, and the determined veracity score for user review.

3. The system as claimed in claim 1, wherein a type of the first performance measure is same as that of the second performance measure, the type is one of a receiver operating characteristic (ROC) curve value, a false negative rate, a classification specificity score, a classification sensitivity score, and a classification accuracy score, wherein the type is selected based on the technical application to which the historical data pertains.

4. The system as claimed in claim 1, wherein the target category comprises a category related to one of an age, a place of residence, a financial income, an app usage, a device usage, a pecuniary value, a citizenship, and a loan.

5. The system as claimed in claim 1, wherein the key feature belongs to one of a type and a category different from that of the input feature.

6. A method for veracity assessment of a machine-learning data model comprising:
receiving, by a processor, training data, historical data, and production data;
receiving, by the processor, the machine-learning data model associated with the historical data and trained using the training data, the historical data comprising a first outcome of the machine-learning data model, wherein the first outcome is provided based on an input feature in the production data;
identifying, by the processor, a key feature in the production data relative to the input feature, wherein the key feature is identified based on a target category in the historical data and a statistical distribution of the input feature in the production data;
determining, by the processor, a second outcome of the machine-learning data model based on the key feature;
in response to the second outcome being different from the first outcome, determining, by the processor, a veracity score for assessing the machine-learning data model, the veracity score providing a measure of veracity of the machine-learning data model;
determining, by the processor, the input feature as biasing the machine-learning data model based on the first outcome being variably dependent on the statistical distribution of the input feature in the production data;
determining, by the processor, an importance value of an input category of the input feature in the production data based on metadata corresponding to a technical application to which the historical data pertains and a preset condition corresponding to a service level objective;
calculating, by the processor, a bias factor based on the input feature and the determined importance value of the input category: wherein the bias factor provides a degree of bias caused by the input feature;
calculating, by the processor, a first performance measure of the machine-learning data model based on the first outcome;
calculating, by the processor, a second performance measure of the machine-learning data model based on the second outcome;
determining, by the processor, a feature gap factor based on an absolute difference between the first performance measure and the second performance measure being non-zero;
calculating, by the processor, a feature gap index based on a probability of classifying the input feature in a most relevant category, wherein the most relevant category corresponds to the target category;
determining, by the processor, a manipulation of the input feature based on a set of features including the input feature and the key feature in the production data, the input feature is determined as a manipulated input feature based on the statistical distribution of the input feature being different from that of at least one neighboring feature in the set, wherein the at least one neighboring feature includes the key feature;
calculating, by the processor, a manipulation factor based on the manipulated input feature and a total number of features in the set including the key feature;
determining, by the processor, the input feature as being a target feature based on the importance value of the corresponding input category, wherein the input feature is the target feature in the set if the importance value of the input category exceeds a preset importance threshold value;
determining, by the processor, a timestamp associated with the target feature and a time threshold value associated with the target category,
determining, by the processor, the target feature as being stale based on the timestamp being less than the time threshold value, wherein the stale target feature is removed from the set;
calculating, by the processor, a staleness factor based on the target feature and the determined importance value of the corresponding input category;
determining, by the processor, the veracity score based on the bias factor, the feature gap factor, the manipulation factor, and the staleness factor;
updating, by the processor, the training data to include the key feature, the first outcome, the second outcome, and the production data after removing at least one of the manipulated input feature and the stale target feature to improve the veracity of the machine-learning data model; and recommending, by the processor, to re-train by the machine-learning data model based on the updated training data for improving the veracity of the machine-learning data model.

7. The method as claimed in claim 6, further comprising outputting, by the processor, at least one of the recommendation to re-train the machine-learning data model, the key feature, and the determined veracity score for user review.

8. The method as claimed in claim 6, wherein a type of the first performance measure is same as that of the second performance measure, the type is one of a receiver operating characteristic (ROC) curve value, a false negative rate, a classification specificity score, a classification sensitivity score, and a classification accuracy score, wherein the type is selected based on the technical application to which the historical data pertains.

9. The method as claimed in claim 6, wherein the target category comprises a category related to one of an age, a place of residence, a financial income, an app usage, a device usage, a pecuniary value, a citizenship, and a loan.

10. The method as claimed in claim 6, wherein the key feature belongs to one of a type and a category different from that of the input feature.

11. A non-transitory computer readable medium comprising machine executable instructions that are executable by a processor for veracity assessment of a machine-learning data model, the processor to:
  receive training data, historical data, and production data;
  receive the machine-learning data model associated with the historical data and trained using the training data, the historical data comprising a first outcome of the machine-learning data model, wherein the first outcome is provided based on an input feature in the production data;
  identify a key feature in the production data relative to the input feature, wherein the key feature is identified based on a target category in the historical data and a statistical distribution of the input feature in the production data;
  determine a second outcome of the machine-learning data model based on the key feature;
  in response to the second outcome being different from the first outcome, determine a veracity score for assessing the machine-learning data model, the veracity score providing a measure of veracity of the machine-learning data model, wherein the veracity score is determined based on the aspect of the input feature;
  determine the input feature as biasing the machine-learning data model based on the first outcome being variably dependent on the statistical distribution of the input feature in the production data;
  determine an importance value of an input category of the input feature in the production data based on metadata corresponding to a technical application to which the historical data pertains and a preset condition corresponding to a service level objective;
  calculate a bias factor based on the input feature and the determined importance value of the input category, wherein the bias factor provides a degree of bias caused by the input feature;
  calculate a first performance measure of the machine-learning data model based on the first outcome;
  calculate a second performance measure of the machine-learning data model based on the second outcome;
  determine a feature gap factor based on an absolute difference between the first performance measure and the second performance measure being non-zero;
  calculate a feature gap index based on a probability of classifying the input feature in a most relevant category, wherein the most relevant category corresponds to the target category;
  determine a manipulation of the input feature based on a set of features including the input feature and the key feature in the production data, the input feature is determined as a manipulated input feature based on the statistical distribution of the input feature being different from that of at least one neighboring feature in the set, wherein the at least one neighboring feature includes the key feature;
  calculate a manipulation factor based on the manipulated input feature and a total number of features in the set including the key feature;
  determine the input feature as being a target feature based on the importance value of the corresponding input category, wherein the input feature is the target feature in the set if the importance value of the input category exceeds a preset importance threshold value;
  determine a timestamp associated with the target feature and a time threshold value associated with the target category;
  determine the target feature as being stale based on the timestamp being less than the time threshold value, wherein the stale target feature is removed from the set;
  calculate a staleness factor based on the target feature and the determined importance value of the input category;
  determine the veracity score based on the bias factor, the feature gap factor, the manipulation factor, and the staleness factor;
  update the training data to include the key feature, the first outcome, the second outcome, and the production data after removing at least one of the manipulated input feature and the stale target feature to improve the veracity of the machine-learning data model; and
  recommend to re-train the machine-learning data model based on the updated training data for improving the veracity of the machine-learning data model.

12. The non-transitory computer readable medium as claimed in claim 11, including machine executable instructions that are executable by the processor to further output at least one of the recommendation to re-train the machine-learning data model, the key feature, and the determined veracity score for user review.

13. The non-transitory computer readable medium as claimed in claim 11, wherein a type of the first performance measure is same as that of the second performance measure, the type is one of a receiver operating characteristic (ROC) curve value, a false negative rate, a classification specificity score, a classification sensitivity score, and a classification accuracy score, wherein the type is selected based on the technical application to which the historical data pertains.

14. The non-transitory computer readable medium as claimed in claim 11, wherein the target category comprises a category related to one of an age, a place of residence, a financial income, an app usage, a device usage, a pecuniary value, a citizenship, and a loan.

* * * * *